No. 619,377. Patented Feb. 14, 1899.
C. WHITNEY & J. F. STEWARD.
CORN HARVESTER.
(Application filed Dec. 19, 1895.)
(No Model.) 4 Sheets—Sheet 2.
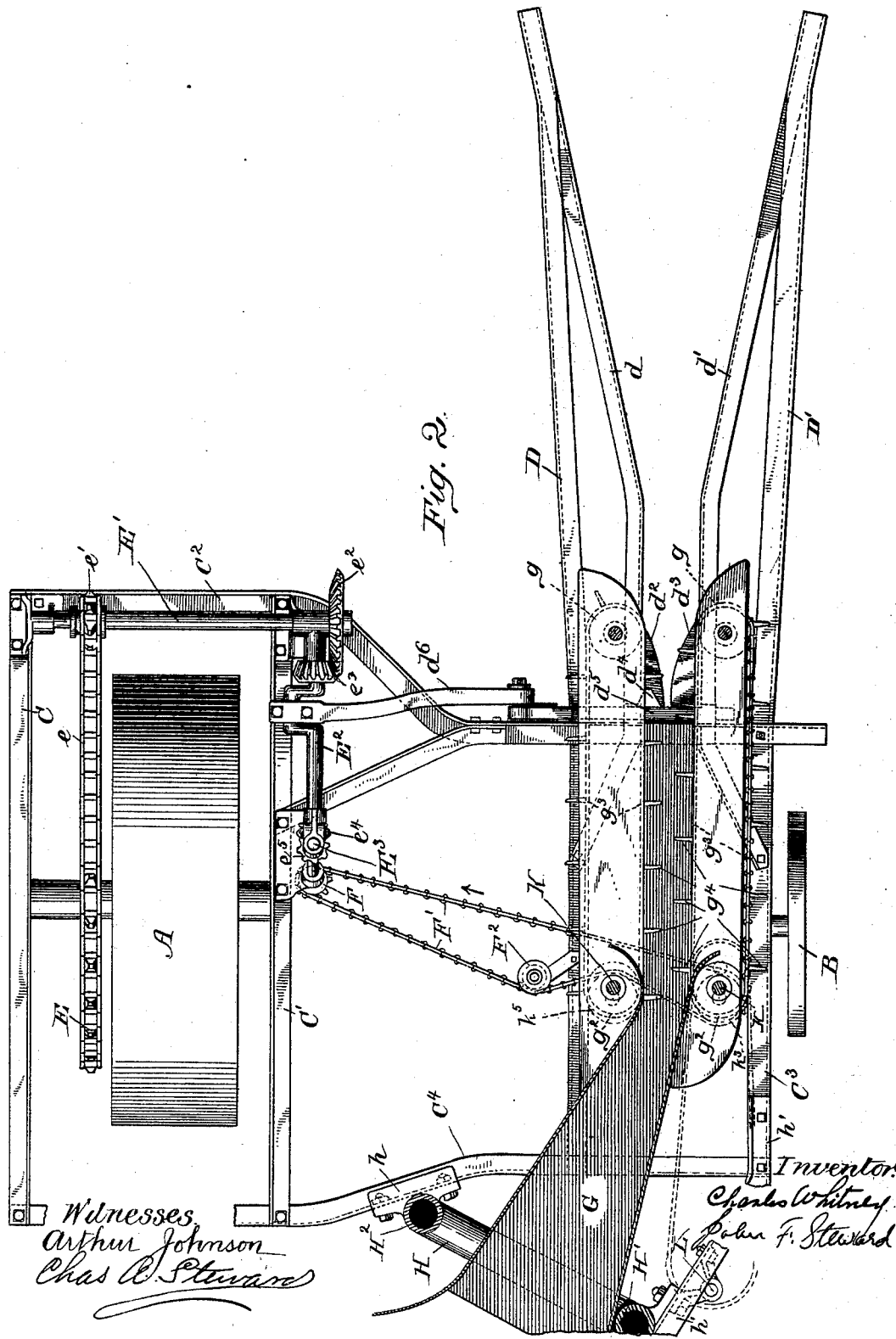

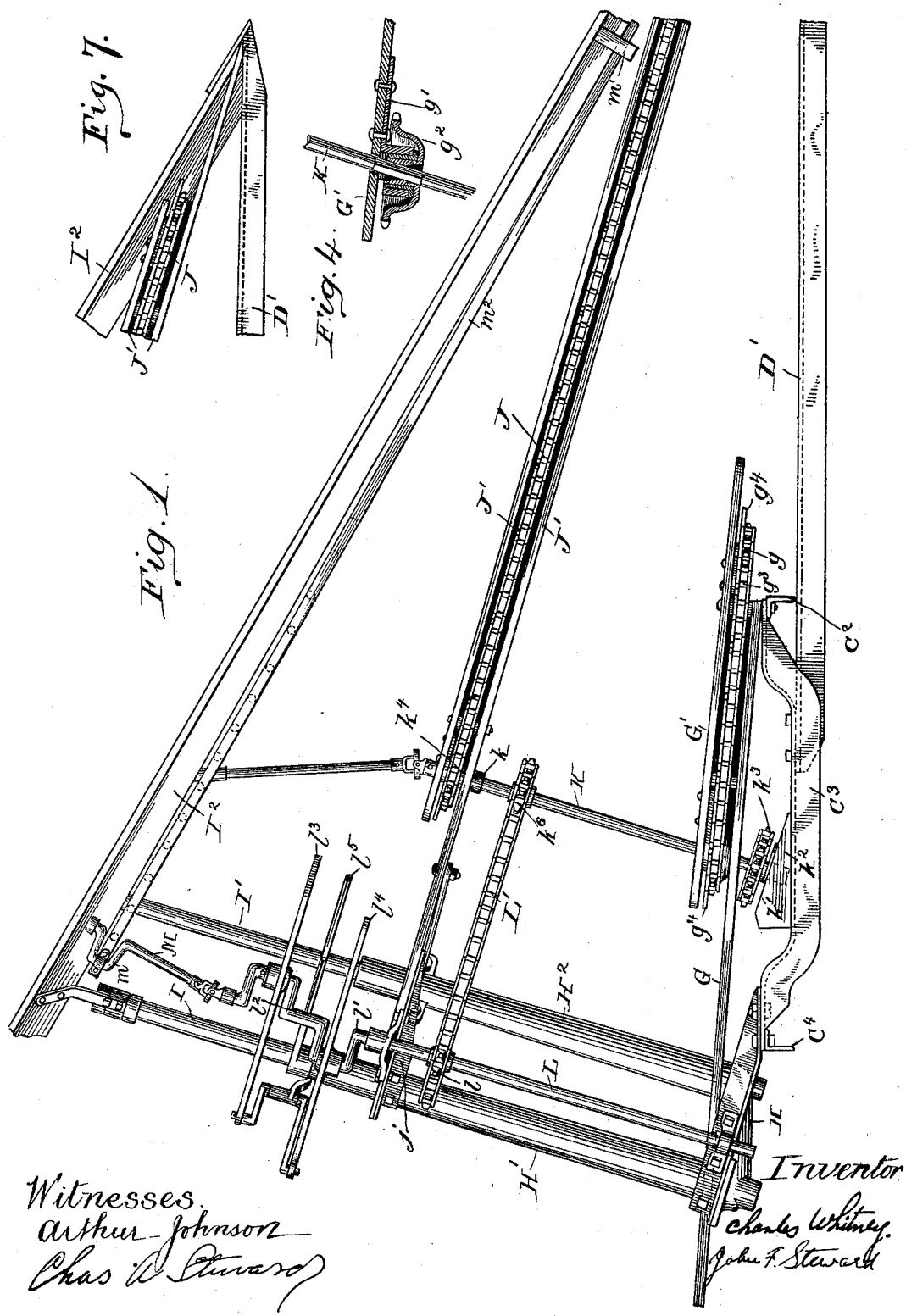

No. 619,377. Patented Feb. 14, 1899.
C. WHITNEY & J. F. STEWARD.
CORN HARVESTER.
(Application filed Dec. 19, 1895.)
(No Model.) 4 Sheets—Sheet 3.
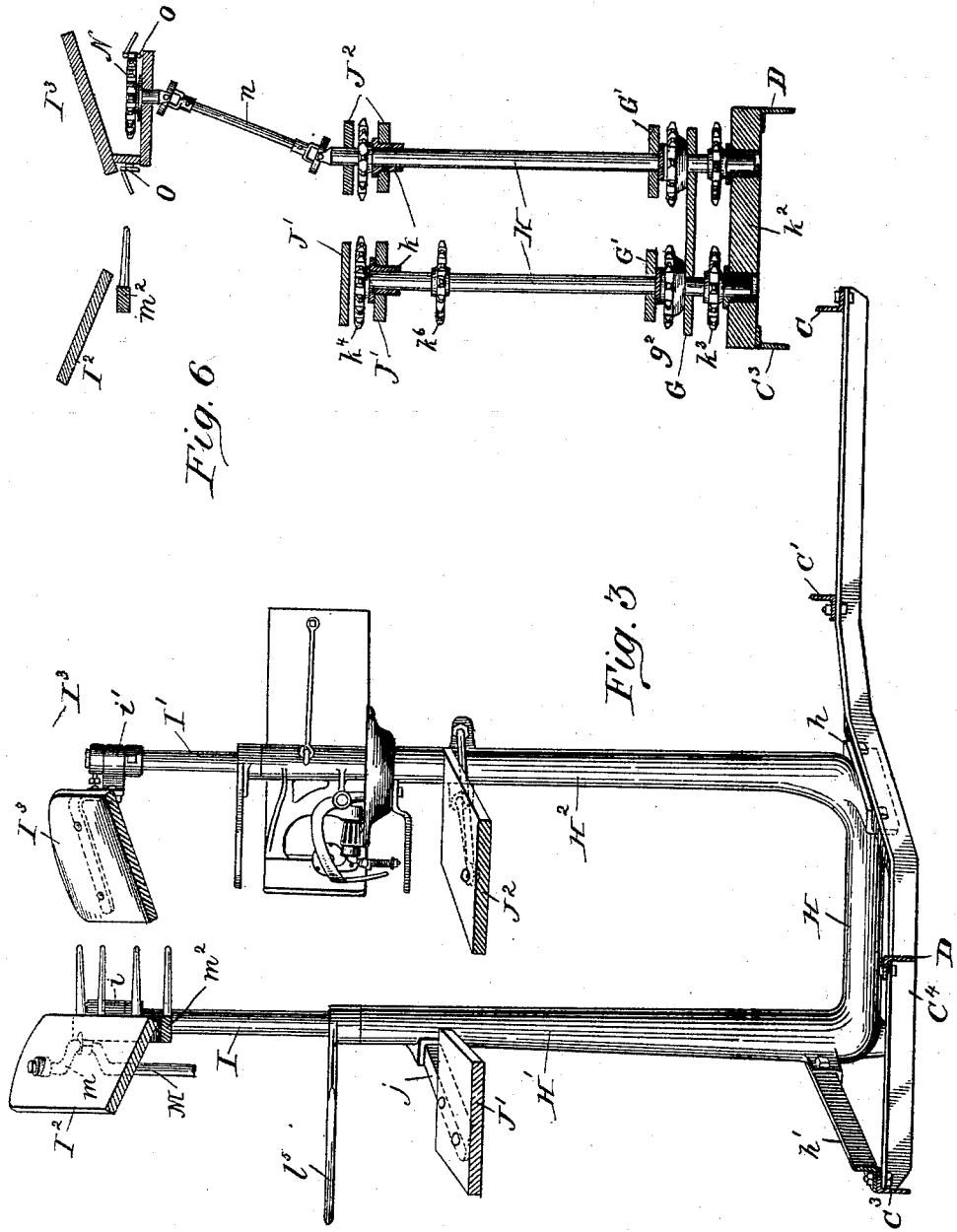
Witnesses
Arthur Johnson
Chas A. Steward
Inventor
Charles Whitney,
John F. Steward.

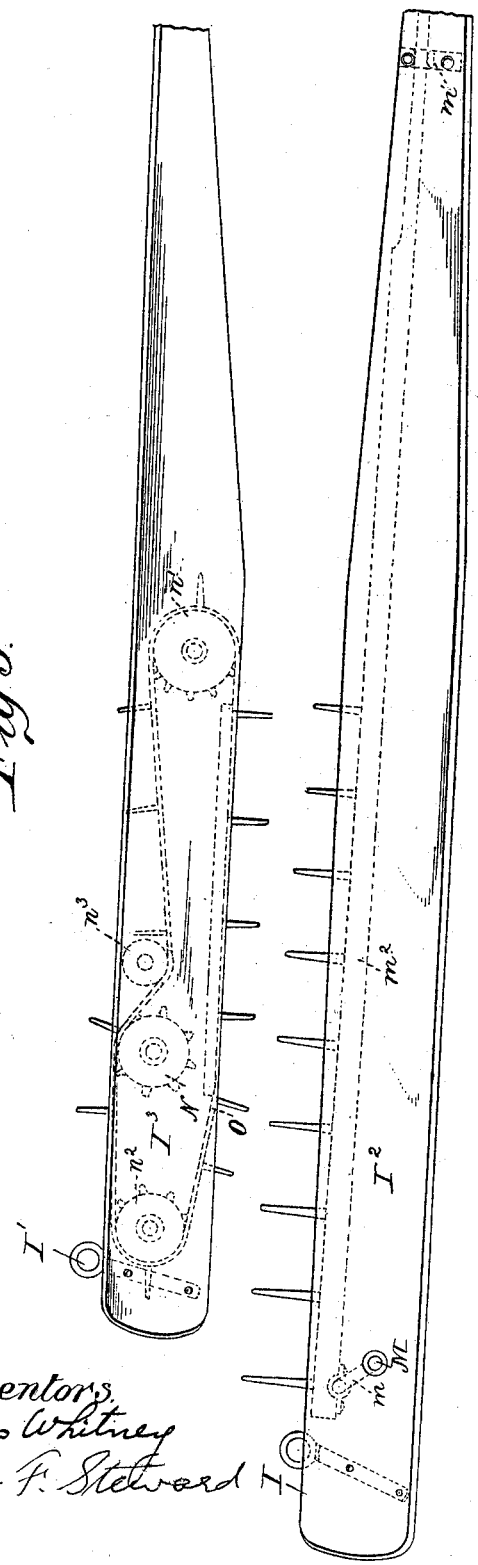

UNITED STATES PATENT OFFICE.

CHARLES WHITNEY, OF WINNETKA, AND JOHN F. STEWARD, OF CHICAGO, ILLINOIS, ASSIGNORS TO THE DEERING HARVESTER COMPANY, OF CHICAGO, ILLINOIS.

CORN-HARVESTER.

SPECIFICATION forming part of Letters Patent No. 619,377, dated February 14, 1899.

Application filed December 19, 1895. Serial No. 572,625. (No model.)

*To all whom it may concern:*

Be it known that we, CHARLES WHITNEY, of Winnetka, and JOHN F. STEWARD, of Chicago, in the county of Cook and State of Illinois, have invented certain new and useful Improvements in Corn-Harvesters, of which the following is a full specification, reference being had to the accompanying drawings, in which—

Figure 1 is a grain side elevation of the machine; Fig. 2, a plan view; Fig. 3, a front sectional elevation; Fig. 4, a detail of one of the chain-driving sprocket-wheels and the shaft that drives it; Fig. 5, a plan view of the upper gathering devices. Fig. 6 is a front elevation in section of the upper gathering devices and the means for driving them, and Fig. 7 is a side elevation showing the front end of the gatherers.

The object of our invention is to provide a simple frame structure and to improve details of construction of that class of corn-harvesters in which the stalks of corn are bound while yet standing after being cut and then discharged from the machine.

A and B are the supporting-wheels, each secured to the main frame, which consists of the parts C, C', $C^2$, $C^3$, and $C^4$, in any suitable manner. Extending from front to rear of the main frame is the bar D, and secured to the bar $C^3$ of the frame is the extension D'. Between the bars D and D' are placed the two gatherers $d$ and $d'$, adapted to pass each side of the row and guide the cornstalks back to the cutters $d^2$ and $d^3$. At the rear of the space between the two cutters moves the knife-section $d^4$, secured to the bar $d^5$. The reciprocating section $d^4$ is for the purpose of severing weeds, grass, and parts of cornstalks that are not cut by the cutters $d^2$ and $d^3$. The reciprocating section is given movement through the pitman $d^6$, a suitable crank-shaft, and gearing, by which motion is transmitted from the master-wheel A. Upon the said master-wheel shaft is the sprocket-wheel E, carrying the chain $e$. Upon the shaft E' is the small sprocket-wheel $e'$, and upon the same shaft is the bevel-gear $e^2$, the said shaft being journaled in suitable bearings. Extending rearward therefrom is the crank-shaft $E^2$, having the pinion $e^3$, adapted to mesh with gear $e^2$. Upon the rear of the said shaft is the bevel-pinion $e^4$. Said shaft is mounted in suitable bearings, its rearmost bearing being formed by a bracket, that also receives bearings for the inclined shaft $E^3$, upon the upper end of which is the pinion $e^5$ and upon the lower end of which is the sprocket-wheel F. This arrangement of gearing forms no part of our invention. We have chosen to use it because of its being more simple than the system of gearing invented by us.

Extending rearwardly from the cutting apparatus is the floor G, which may be considered as the binder-table. A little distance over this flooring the board G' is secured to the main frame by means of suitable bolts. Upon a suitable stud bolted to the board G' is a sprocket-wheel $g$. At the rear end of the board, bolted to the lower surface, is the bracket $g'$. Upon this is supported and revolves the sprocket-wheel $g^2$. Around the said sprocket-wheel is the chain $g^3$, having the teeth $g^4$. These parts form the lower gathering device and may be considered as duplicates. They move in the same direction, and thus have a feeding action upon the stalks that pass between them. These chains are adapted, as shown in Fig. 2, to extend a litttle forward of the cutting apparatus, so that their teeth can gather the stalks and force them between the cutting-knives $d^2$ and $d^3$ and afterward move the butts of the severed stalks backward some distance on the platform G.

H is the usual frame for the binding mechanism, H' being that portion through which the needle-shaft passes and the part $H^2$ that through which the knotter-driving shaft extends. We make various parts of a binding attachment serve as members of the supporting-frame of the gathering and stalk-guiding parts of the machine, and thus do away with expensive framework that is usually found on machines of this class. The binding attachment, as will be readily seen, is, as far as the principles of binding are concerned, an ordinary grain-binder placed upon end. The base of the binder-frame may be supported to the main frame by any desirable means; but we choose to so support it by the brackets $h$ and $h'$. Upon this binding-attachment frame we support the rear ends of all parts of the gathering devices, as stated, except the butt-moving chains $g^3$. We so lean our binding attachment that the parts instrumental in packing and binding the bundle shall reach to a point as near directly over the termination of the gathering-chains $g^3$ as possible, so as to give the butts of the bundles ample space in which to accumulate.

I is the needle-shaft, and I' the knotter-driving shaft. These shafts extend upward, as shown in Figs. 1 and 3, and serve as supports for the gathering-boards $I^2$ and $I^3$.

J are gathering-chains placed above those $g^3$. They are suitably supported on the boards $J'$; the latter, at their rear ends, are secured to the binder-frame by means of the brackets $j$. Each board extends to the forward end of the bar $D'$ and may be there secured, in connection with the board $I^2$, in any suitable manner.

Upon the two shafts, between suitable collars, are secured the brackets $i'$. These parts are loosely supported upon the shaft, so that as the latter moves the positions of the gathering-boards are not affected.

Reference to Figs. 1 and 3 will show the construction of our upper frame and the fact that no supports at the rear of the machine whatever are required, the binder frames and shafts taking the place of such. This construction enables us to simplify the framework exceedingly and to make a machine that can be quickly and easily taken from the boxes in which the parts are packed and set up.

The gathering-chains $g^3$ and J are given movement in the following manner: K is a shaft, its upper end inclined forward, as shown in Fig. 1, preferably to a parallel position relative to the packer-shaft L of the binder H. This shaft is journaled in bearings $k$ and $k'$, the former in the board $J'$ and the latter in a pillow-block $k^2$ on the lower frame. The board $J'$ is duplicated in that $J^2$, and the chain J is also duplicated, the said last pair of chains being above the gathering-chains $g^3$ in the positions shown in Fig. 1. Upon the lower end of the shaft K is the sprocket-wheel $k^3$, and upon the upper end of the shaft is the sprocket-wheel $k^4$, that gives motion to the gathering-chain J. This shaft K is duplicated, as shown in section in Fig. 2. Upon the lower end of this duplicate shaft is the sprocket-wheel $k^5$, (shown in dotted lines,) as will be seen in Fig. 2. Around this last sprocket-wheel and that $k^3$ and also around the sprocket-wheel F is thrown the chain F', which passes around the idler $F^2$. By placing the chain thus around the idler it is caused to wrap the sprocket-wheel $k^5$ sufficiently to give the same rotation. Passing the chain, as shown, it revolves all the gathering-chains in the proper direction. In order that the shaft K may give motion to the gathering-chains $g^3$, it is squared at its lower end and passes through an hour-glass-shaped eye in the sprocket-wheel $g^2$. The necessity of this peculiar eye is brought about by the fact that the gathering-chains $g^3$ do not extend at a right angle relative to the shaft K. The sprocket-wheel may be said to be connected with the shaft K by means of a universal joint. The kind shown is simple and effective. Near the upper end of the shaft K is the sprocket-wheel $k^6$. Upon the shaft L is the sprocket-wheel $l$. The shaft L is what is usually termed the "packer-shaft," having the crank $l'$ and $l^2$ and mounted thereupon the packers $l^3$ and $l^4$, the needle $i^5$ being secured to its shaft between said packers in the usual manner. Passing around the sprocket-wheels $k^5$ and $l$ is the chain L'. It will thus be seen that all of the gathering-chains and the prime moving shaft of the binder—namely, the packer-shaft L—receive their motions in the proper directions from the single driving sprocket-wheel F.

Adjacent to the gathering-boards $I^2$ and $I^3$ are the upper stalk-feeding devices. (Represented in Fig. 5.) They may be below or above the said boards. We prefer to place them, as shown, beneath the gathering-boards.

Extending upward from the packer-crank is the shaft M, having the crank $m$. This shaft is supported at its upper end in the board $I^2$. Near the forward end of the said gathering-board is a guide $m'$. Sliding in this and supported upon the crank $m$ is the bar $m^2$, having teeth projecting therefrom into the space between the two gathering-boards. As the crank rotates this bar is not only slid endwise, but its upper end is moved laterally, so that the teeth are thrust into the said space when moving backward and fully withdrawn when moving forward. Beneath the gathering-board $I^3$ is located a sprocket-wheel N upon the short shaft, and upward from the upper end of the shaft K extends the shaft $n$, which shaft is knuckled to that to which the sprocket-wheel N is secured and to the said shaft K beneath the board, and a suitable distance toward the forward end thereof is the idler $n'$, and below the gathering-board, near the upper end, is the idler $n^2$. Around the sprocket-wheel referred to and the idler is thrown the toothed chain $o$. In order that the said chain may wrap the sprocket-wheel N sufficiently to be carried thereby, an additional idler $n^3$ is supplied. By this construction we have a continuously-running chain upon one side of the passage-way for the stalks and a reciprocating bar or rake having a withdrawing action as part of its movement. We are aware that two gathering-chains have been used for carrying the stalks at their upper ends, and we are also aware that a pair of reciprocating bars have been used, and have found that where two gathering-chains are used the stalks become suspended to the chain-teeth, having no chance to slide off from the ends of the teeth, and as the chains move diagonally upward they carry the stalks therewith and remove the butts of the stalk upward from the table upon which the butt of the bundle forms, resulting in a very ragged bundle. We find that where a pair of reciprocating bars are used the best results cannot be obtained, for if they work in unison they jam clusters of ears between them, and if they do not work in unison they toss the stalks from one side to the other of the passage-way without carrying them rearward as fast as they should be carried. We have found it necessary in practice to have one traveling surface at least move constantly, so that there will always be a tendency to keep the stalks moving. We have shown the teeth of the upper gathering-chain deflected downward. This is so as to let the ears hanging thereon slip off at the end, so that the stalks may be permitted to drop endwise to the table upon which they should move to the binder receptacle, and the presence of the teeth of the reciprocating bars prevents the stalks from falling forward. The coaction of these two parts serves the purpose of carrying the tops of the stalks backward without the objectionable features made apparent when attempts are used to employ a pair of chains or a pair of reciprocating bars. We find also that if the chain O is left quite slack its teeth will droop enough, under the weight of a suspended stalk and ear, to free itself and let the latter drop to the table G.

The chain O carries the stalks engaged by the picker-teeth along continuously and also those that are entangled therewith, the function of the tooth-reciprocating device being in part to free the stalks that get bunched together and prevent them from clogging the machine. In short, this device may be said to operate upon the stalks for the purpose of equalizing the stream of corn passing through the machine. Further, it will be seen by referring to Fig. 5 that the toothed bar extends rearwardly beyond the chain O. There is of course the usual tendency of the chain to draw in corn-leaves as it passes away from the gathering-slot. This tendency is counteracted by the action of that part of the toothed bar extending rearwardly beyond the chain, which action wipes the rear part of the chain clear of the stalks before the chain-teeth have time to carry the leaves of the corn in and around its sprocket-wheel by its angular movement in withdrawing from the slot, which tendency has been so difficult heretofore to overcome.

What we claim as our invention, and desire to secure by Letters Patent, is—

1. In a frame structure for upright corn-harvesters, the combination of the supporting-frame, the binder-frame, consisting of the upright arms H' and H² and the gatherer-bars J' and J² secured at their forward ends to the said supporting-frame and at their rearward ends to the said binder-frame, substantially as described.

2. The combination of the main supporting-frame, the stalk-supporting table mounted thereon, the binder-frame consisting of the shaft-supports H' and H², the binder portion of the machine having the shafts I and I', the gathering parts I² and I³ supported upon the said shafts, substantially as described.

3. In a binder of the class described, the elongated binder-shafts I and I', the gathering parts I² and I³ supported thereupon at their rear ends, substantially as described.

4. In combination with the gathering mechanism of a vertical corn-harvester and as an auxiliary thereto to aid in gathering and conveying the upper portions of the stalks, an endless chain having picker-teeth and adapted to operate upon the corn from one side, and a toothed feeding device having an orbital movement and acting upon the corn from the opposite side, and in substantially the same plane as said endless chain, substantially as described.

5. In combination with the gathering mechanism of the vertical corn-harvester and as an auxiliary thereto to aid in gathering and conveying the upper portion of the stalks, an endless chain having picker-teeth and adapted to operate upon the corn from the one side and the toothed feeding device having an orbital movement and acting upon the corn from the opposite side, both devices being in substantially the same plane and the said endless chain adapted as it moves to the rear to gradually move sidewise away from said reciprocating bar, thus freeing itself from the stalks being operated upon, substantially as described.

6. In a corn-harvester and in combination, gathering-chains J that engage the stalks from each side at about the center of their height, butt-moving chains operating upon the stalks in a plane of movement not parallel to that of said gathering-chains, a head-moving chain operating upon the said stalks from one side and a reciprocating rake-bar operating upon the upper ends of said stalks at the opposite side, the said chains and the said rake-bar adapted to form a stalk-passage, with automatic binding devices at the delivery end of said stalk-passage and the table G, and with the shafts K adapted to transmit rotation to the said gathering and butt-moving chains, sprocket-wheels G⁴ adapted to move said butt-moving chains, all being connected to the said shafts by universal joints, a binder-moving chain L', a tumbling-shaft transmitting rotation from one of the shafts K to the head-moving chain and a cranked tumbling-shaft M transmitting rotation from the constantly-rotating shaft of the binder devices to the said rake-bar, substantially as and for the purpose described.

CHARLES WHITNEY.
JOHN F. STEWARD.

Witnesses:
ARTHUR JOHNSON,
CHAS. A. STEWARD.